United States Patent
Driggs et al.

(10) Patent No.: US 7,232,109 B2
(45) Date of Patent: Jun. 19, 2007

(54) ELECTROSTATIC VALVES FOR MICROFLUIDIC DEVICES

(75) Inventors: B. Scott Driggs, Bossier City, LA (US); Markus M. Enzelberger, Stuttgart (DE); Stephen R. Quake, San Marino, CA (US)

(73) Assignee: California Institute of Technology, Pasadena, CA (US)

( * ) Notice: Subject to any disclaimer, the term of this patent is extended or adjusted under 35 U.S.C. 154(b) by 14 days.

(21) Appl. No.: 10/045,132

(22) Filed: Oct. 23, 2001

(65) Prior Publication Data

US 2002/0109114 A1 Aug. 15, 2002

Related U.S. Application Data

(60) Provisional application No. 60/246,469, filed on Nov. 6, 2000.

(51) Int. Cl.
*F16K 31/02* (2006.01)
(52) U.S. Cl. .................................. 251/129.01
(58) Field of Classification Search ............ 251/129.01
See application file for complete search history.

(56) References Cited

U.S. PATENT DOCUMENTS

| | | | |
|---|---|---|---|
| 3,570,515 A | 3/1971 | Kinner | |
| 3,747,628 A | 7/1973 | Holster et al. | |
| 3,839,176 A * | 10/1974 | McCoy et al. | 204/191 |
| 4,046,159 A | 9/1977 | Pegourie | |
| 4,119,368 A | 10/1978 | Yamazaki | |
| 4,153,855 A | 5/1979 | Feingold | |
| 4,245,673 A | 1/1981 | Bouteille et al. | |
| 4,373,527 A | 2/1983 | Fischell | |

(Continued)

FOREIGN PATENT DOCUMENTS

EP 0 592 094 A2 4/1994

(Continued)

OTHER PUBLICATIONS

"Biochips," Nature Biotechnology, vol. 18, Supplement 2000, pp. IT43-IT44, 2000.

(Continued)

*Primary Examiner*—Eric Keasel
(74) *Attorney, Agent, or Firm*—Townsend and Townsend and Crew LLP

(57) ABSTRACT

Valve structures formed in elastomer material are electrostatically actuated by applying voltage to a flexible, electrically conductive wire pattern. An actuation force generated between the patterned wire structure and an electrode result in closure of a flow channel formed in elastomer material underlying the wire. In one embodiment of a valve structure in accordance with the present invention, the wire structure is patterned by lithography and etching of a copper/polyimide laminate, with an underlying gold plate positioned on the opposite side of the flow channel serving as an electrode. In an alternative embodiment, a first wire structure is patterned by physically cutting out a first pattern of strips from an Aluminum/Mylar(®) laminate sheet. A second patterned wire structure serving as the electrode is formed by the same method, and positioned on the opposite side of a control channel. Application of an actuation force between the first and second patterned strips closes the control channel and an associated flow channel underlying the control channel.

2 Claims, 4 Drawing Sheets

U.S. PATENT DOCUMENTS

| | | |
|---|---|---|
| 4,399,219 A | 8/1983 | Weaver |
| 4,434,704 A | 3/1984 | Surjaatmadja |
| 4,575,681 A | 3/1986 | Grosso et al. |
| 4,662,710 A | 5/1987 | ten Berge |
| 4,898,582 A | 2/1990 | Faste |
| 4,992,312 A | 2/1991 | Frisch |
| 5,085,562 A | 2/1992 | Van Lintel |
| 5,088,515 A | 2/1992 | Kamen |
| 5,096,388 A | 3/1992 | Weinberg |
| 5,126,115 A | 6/1992 | Fujita et al. |
| 5,164,558 A | 11/1992 | Huff et al. |
| 5,171,132 A | 12/1992 | Miyazaki et al. |
| 5,224,843 A | 7/1993 | Van Lintel |
| 5,259,737 A | 11/1993 | Kamisuki et al. |
| 5,265,327 A | 11/1993 | Faris et al. |
| 5,290,240 A | 3/1994 | Horres, Jr. |
| 5,307,186 A | 4/1994 | Izumi et al. |
| 5,323,999 A * | 6/1994 | Bonne et al. ............... 251/11 |
| 5,336,062 A | 8/1994 | Richter |
| 5,346,372 A | 9/1994 | Naruse et al. |
| 5,375,979 A | 12/1994 | Trah |
| 5,376,252 A * | 12/1994 | Ekstrom et al. ............ 204/603 |
| 5,400,741 A | 3/1995 | DeTitta et al. |
| 5,423,287 A | 6/1995 | Usami et al. |
| 5,452,878 A | 9/1995 | Gravesen et al. |
| 5,529,465 A | 6/1996 | Zengerle et al. |
| 5,574,893 A | 11/1996 | Southgate et al. |
| 5,593,130 A | 1/1997 | Hansson et al. |
| 5,642,015 A | 6/1997 | Whitehead et al. |
| 5,656,155 A | 8/1997 | Norcross et al. |
| 5,659,171 A | 8/1997 | Young et al. |
| 5,660,370 A | 8/1997 | Webster |
| 5,665,070 A | 9/1997 | McPhee |
| 5,681,024 A | 10/1997 | Lisec et al. |
| 5,705,018 A | 1/1998 | Hartley |
| 5,759,014 A | 6/1998 | Van Lintel |
| 5,775,371 A | 7/1998 | Pan et al. |
| 5,788,468 A | 8/1998 | Dewa et al. |
| 5,836,750 A * | 11/1998 | Cabuz ....................... 417/322 |
| 5,839,722 A * | 11/1998 | Berlin et al. ................ 269/57 |
| 5,842,787 A | 12/1998 | Kopf-Sill et al. |
| 5,854,684 A | 12/1998 | Stabile et al. |
| 5,875,817 A | 3/1999 | Carter |
| 5,876,187 A | 3/1999 | Forster et al. |
| 5,932,799 A | 8/1999 | Moles |
| 5,942,443 A | 8/1999 | Parce et al. |
| 5,971,355 A | 10/1999 | Biegelsen et al. |
| 5,997,961 A | 12/1999 | Feng et al. |
| 6,007,309 A * | 12/1999 | Hartley ..................... 417/322 |
| 6,043,080 A | 3/2000 | Lipshutz et al. |
| 6,089,534 A * | 7/2000 | Biegelsen et al. ..... 251/129.01 |
| 6,123,769 A | 9/2000 | Sanjoh |
| 6,155,282 A | 12/2000 | Zachary et al. |
| 6,174,365 B1 | 1/2001 | Sanjoh |
| 6,246,330 B1 | 6/2001 | Nielsen |
| 6,296,673 B1 | 10/2001 | Santarsiero et al. |
| 6,329,209 B1 | 12/2001 | Wagner et al. |
| 6,345,502 B1 | 2/2002 | Tai et al. |
| 6,358,387 B1 | 3/2002 | Kopf-Sill et al. |
| 6,375,871 B1 | 4/2002 | Bentsen et al. |
| 6,376,971 B1 | 4/2002 | Pelrine et al. |
| 6,409,832 B2 | 6/2002 | Weigl et al. |
| 6,488,832 B2 | 12/2002 | Heller |
| 6,488,872 B1 | 12/2002 | Beebe et al. |
| 6,520,936 B1 | 2/2003 | Mann |
| 6,541,071 B1 | 4/2003 | Bookbinder et al. |
| 6,667,124 B2 | 12/2003 | Suenaga et al. |
| 6,689,473 B2 | 2/2004 | Guire et al. |
| 6,713,327 B2 | 3/2004 | Leedy |
| 6,716,378 B2 | 4/2004 | Yang et al. |
| 6,765,279 B2 | 7/2004 | Leedy |
| 6,767,706 B2 | 7/2004 | Quake et al. |
| 6,829,753 B2 | 12/2004 | Lee et al. |
| 6,847,153 B1 | 1/2005 | Balizer |
| 6,866,785 B2 | 3/2005 | Zare et al. |
| 6,884,346 B2 | 4/2005 | Zare et al. |
| 2001/0027745 A1 | 10/2001 | Weigl et al. |
| 2002/0005354 A1 | 1/2002 | Spence et al. |
| 2002/0014673 A1 | 2/2002 | Leedy |
| 2002/0037499 A1 | 3/2002 | Quake et al. |
| 2002/0045297 A1 | 4/2002 | Leedy |
| 2002/0058332 A1 | 5/2002 | Quake et al. |
| 2002/0108096 A1 | 8/2002 | Lee et al. |
| 2003/0080442 A1 | 5/2003 | Unger |
| 2003/0134129 A1 | 7/2003 | Lammertink et al. |
| 2004/0248167 A1 | 12/2004 | Quake et al. |
| 2005/0065735 A1 | 3/2005 | Lee et al. |

FOREIGN PATENT DOCUMENTS

| | | |
|---|---|---|
| EP | 0 703 364 A1 | 3/1996 |
| EP | 0 706 004 A2 | 4/1996 |
| EP | 0 779 436 A2 | 6/1997 |
| EP | 0 829 360 A2 | 3/1998 |
| EP | 0 845 603 A1 | 6/1998 |
| EP | 0 999 055 A2 | 5/2000 |
| EP | 1 065 378 A2 | 1/2001 |
| GB | 2 097 692 A | 11/1982 |
| GB | 2 155 152 A | 9/1985 |
| GB | 2 308 460 A | 6/1997 |
| WO | WO 98/07069 A1 | 2/1998 |
| WO | WO 99/00655 A2 | 1/1999 |
| WO | WO 99/04361 A1 | 1/1999 |
| WO | WO 99/17093 A1 | 4/1999 |
| WO | WO 99/52633 A1 | 10/1999 |
| WO | WO 00/00678 A1 | 1/2000 |
| WO | WO 00/43748 A1 | 7/2000 |
| WO | WO 00/60345 A1 | 10/2000 |
| WO | WO 01/06529 A1 | 1/2001 |
| WO | WO 01/06575 A1 | 1/2001 |
| WO | WO 01/09595 A3 | 1/2001 |
| WO | WO 01/09595 A2 | 2/2001 |
| WO | WO 02/82047 A2 | 10/2002 |

OTHER PUBLICATIONS

"Chapter 9: Microfluidic devices," Micromachined Transducers Sourcebook, pp. 779-882, 1998.

"Last Chance For Micromachines," The Economist Technology quarterly, 8 pages, Dec. 7, 2000.

Ahn, chong H. et al., "Fluid Micropumps Based On Rotary Magnetic Actuators," Proceedings of 1995 IEEE Micro Electro Mechanical Systems Workshop (MEMS '95), Amsterdam, Netherlands, pp. 408-412, Jan. 29-Feb. 2, 1995.

Anderson, Janelle r. et al., "Fabrication Of Topologically Complex Three-Dimensional Microfluidic Systems In PDMS By Rapid Prototyping," analytical Chemistry, vol. 72, No. 14, pp. 3158-3164, Jul. 15, 2000.

Anderson, Rolfe C. et al., "Microfluidic biochemical Analysis System," Transducers *3 97, 1997 International Conference on Solid-State Sensors and Acuators, Chicago, Illinois, pp. 477-480, Jun. 16-19, 1997.

Angell, James B. et al., "Silicon Micromechanical Devices," Scientific American, pp. cover, 44-55, Apr. 1983.

Armani, Deniz et al., "Re-configurable Fluid circuits By PDMS Elastomer Micromatchining," IEEE Int. Conf. Micro Electro Mech. Syst. Tech. Digest, vol. 12, pp. 222-227, 1999.

Ballantyne, J. P. et al., "Selective Area Metallization By Electron-Beam Controlled Direct Metallic Deposition," J. Vac. Sci. Technol., vol. 10, No. 6, pp. 1094-1097, Nov. 1973.

Benard, W. L. et al., " A Titanium-Nickel shape-Memory Alloy Actuated Micropump," Transducers *3 97, 1997 International Conference on Solid-State Sensors and Actuators, Chicago, Illinois, pp. 361-364, Jun. 16-19, 1997.

Bloomstein, T. M. et al., "Laser-Chemical Three-Dimensional Writing For Microelectromechanics And Application To Standard-Cell Microfluidics," J. Vac. Sci. Technol. B, vol. 10, No. 6, pp. 2671-2674, Nov. 1992.

Bousse, Luc et al., "Electrokinetically Controlled Microfluidic Analysis Systems," Annu. Rev. Biophys. Biomol. Struct., vol. 29, pp. 155-181, 2000.

Brechtel, R. et al., "Control Of The Electroosmotic Flow By Metal-Salt-containing Buffers," Journal of chromatography A, vol. 716, pp. 97-105, 1995.

Bryzek, Janusz et al., "Micromachines On The March", IEEE Spectrum, vol. 31, No. 5, pp. 20-31, May 1994.

Buchaillot, Lionel et al., "Silicon Nitride Thin Films Young's Modulus Determination By An Optical Non-Destructive Method;" Jpn. J. Appl. Phys., 36 Pt. 2(6B):L794-L797 1997.

Calkins, Kathryn, "Mycometrix: Rubber Chips," BioCentury, 2 pages, Oct. 16, 2000.

Chan, Jason H. et al., "Microfabricated Polymer Devices For Automated Sample Delivery Of Peptides For Analysis By Electrospray Ionization Tandem Mass Spectrometry," Analytical Chemistry, vol. 71, No. 20, pp. 4437-4444, Oct. 15, 1999.

Chiang, Yuh-Min et al., "Characterizing The Process Of Cast Molding Microfluidic Systems," SPIE, vol. 3877, pp. 303-311, Sep. 1999.

Chiu, Daniel T. et al., "Patterned Deposition Of Cells And Proteins Onto Surfaces By Using Three-Dimensional Microfluidic Systems," PNAS, vol. 97, No. 6, pp. 2408-2413, Mar. 14, 2000.

Chou, Hou-Pu et al., "A Microfabricated Device For Sizing And Sorting DNA Molecules," Proc. Natl. Acad. Sci., vol. 96, pp. 11-13, Jan. 1999.

Chou, Hou-Pu et al., "A Microfabricated Rotary Pump," Biomedical Microdevices, vol. 3, No. 4, pp. 323-330, 2001.

Chou, Hou-Pu et al., "Integrated Elastomer Fluidic Lab-On-A-chip-Surface Patterning And DNA Diagnostics," Proceedings of the Solid State Actuator and Sensor Workshop, Hilton Head, South Carolina, 4 pages, 2000.

Chou, Hou-Pu et al., "Multiple Disease Diagnostics On A Single Chip," Biophysics Lab, Caltech, pp. 1-4, Mar. 1, 2000.

Delamarche, Emmanuel et al., "Patterned Delivery Of Immunoglobulins To Surfaces Using Microfluidic Networks," Science, vol. 276, pp. 779-781, May 2, 1997.

Dharmatilleke, Saman et al., "Three-0Dimensional Silicone Device Farication And Interconnection Scheme For Microfluidic Applications Using Sacrificial Wax Layers," Micro-Electro-Mechanical Systems (MEMS), vol. 2, pp. 413-418, 2000.

Duffy, David C. et al., "Patterning Electroluminescent Materials With Feature Sizes As Small As 5μm Using Elastomeric Membranes As Masks For Dry Lif-Off," Advanced Materials, vol. 11, No. 7, pp. 546-552, 1999.

Duffy, David C. et al., "Rapid Prototyping Of Microfluidic Switches In Poly(dimethyl siloxane) And Their Actuation By Electro-Osmotic Flow," J. Micromech. Microeng., vol. 9, pp. 211-217, 1999.

Duffy, David C. et al., "Rapid Prototyping Of Microfluidic Systems in Poly(dimethylsiloxane)," Analytical Chemistry, vol. 70, No. 23, pp. 4974-4984, Dec. 1, 1998.

Effenhauser, Carlo S. et al., "Integrated Capillary Electrophoresis On Flexible silicone Microdevices: Analysis Of DNA Restriction Fragments And Detection Of single DNA Molecules On Microchips," Analytical Chemistry, vol. 69, No. 17, pp. 3451-3457, Sep. 1, 1997.

Effenhauser, Carlo S. et al., "Integrated Chip-Based Capillary Electrochoresis," Electrophoresis, vol. 18, pp. 2203-2213, 1997.

Ericson, Christer et al., "Electroosmosis- And Pressure-Driven Chromatography In Chips Using continuous Beds," Analytical Chemistry, vol. 72, No. 1, pp. 81-87, Jan. 1, 2000.

Fahrenberg, J. et al., "A Microvalve System Fabricated By Thermoplastic Molding," J. Micromech. Microeng., vol. 5, pp. 169-171, 1995.

Fettinger, J. C. et al., "Stacked Modules For Micro Flow Systems In Chemical Analysis: Concept And Studies Using An Enlarged Model," Sensors and Actuators B, vol. 17, pp. 19-25, 1993.

Figeys, Daniel et al., "An Integrated Microfluidics-Tandem Mass Spectrometry System For Automated Protein Analysis," Analytical Chemistry, vol. 70, No. 18, pp. 3728-3734, Sep. 15, 1998.

Figeys, Daniel et al., "Nanoflow Solvent Gradient Delivery From A Microfabricated Device for Protein Identifications By Electrospray Ionization Mass Spectromety," Analytical Chemistry, vol. 70, No. 18, pp. 3721-3727, Sep. 15, 1998.

Folch, a. et al., "Molding Of Deep Polydimethylsiloxane Microstructures For Microfluidics And Biological Applications," Journal of Biomechanical Engineering, vol. 121, pp. 28-34, Feb. 1999.

Fu, Anne Y. et al., "A Microfabricated Dluorescence-Activated Cell-0Sorter," Nature Biotechnology, vol. 17, pp. 1109-1111, Nov. 1999.

Galambos, Paul et al., "Electrical And Fluidic Packaging Of Surface Micromachined Electro-Microfluidic Devices," 8 pages, no date.

Gao, Jun et al., "Integrated Microfluidic system Enabling Protein Digestion, Peptide Separation, And Protein Identification," Analytical Chemistry, vol. 73, No. 11, pp. 2648-2655, Jun. 1, 2001.

Gass, V. et al., "Integrated Flow-Regulated Silicon Micropump," Sensors and Actuators A, vol. 43, pp. 335-338, 1994.

Gerlach, Torsten, "Pumping Gases By A Silicon Micro Pump With Dynamic Passive Valves," Transducers '97, 1997 International Conference on Solid-State Sensors and Actuators,. Chicago, Illinois, pp. 357-360, Jun. 16-19, 1997.

Goll, C. et al., "Microvalves With Bistable Buckled Polymer Diaphragms," J. Micromech. Microeng., vol. 6, pp. 77-79, 1996.

Gravesen, Peter et al., "Microfluidics-A Review," J. Micromech. Microeng., vol. 3, pp. 168-192, 1993.

Greene, Chana, "Characterizing The Properties Of PDMS," pp. 1-11, Summer 2000.

Guerin, L. J. et al., "Simple And Low Cost Fabrication Of Embedded Micro-Channels By Using A New Thick-Film Photoplastic," Transducers '97, 1997 International Conference on Solid-State Sensors and actuators, Chicago, Illinois, pp. 1419-1422, Jun. 18-19, 1997.

Harrison, D. Jed et al., "Micromachining A Miniaturized Capillary Electrophoresis-Based Chemical Analysis System On A Chip," Science, vol. 261,m pp. 895-897, Aug. 13, 1993.

Henion, Jack et al., "Capillary Electrophoresis/Mass Spectrometry: From One Meter Capillaries To Chip-Based Devices," 2 pages, 1999.

Hicks, Jennifer, "Genetics And Drug Discovery Dominate Microarray Research," R&D Magazine, pp. 28-33, Feb. 1999.

Hofmann, Oliver et al., "Modular Approach To Fabrication Of Three-Dimensional Microchannel Systems In PDMS—Application To Sheath Flow Microchips," Lab on a Chip, vol. 1, pp. 108-114, 2001.

Hopfgartner, Gerard et al., "Exact Mass Measurement Of Product Ions For The Structural Elucidation Of Drug Metabolites With A Tandem Quadrupole Orthogonal-Acceleration Time-Of-Flight Mass Spectrometer," Journal of The Americal Society for Mass Spectrometry, vol. 10, pp. cover, 1305-1314, Dec. 1999.

Horn, Howard, "Lab Chips Sector: Microtechnologies Are Changing Healthcare And More," Life Sciences, pp. 19-21, Mar. 20, 2001.

Hornbeck, Larry J. et al., "Bistable Deformable Mirror Device," Spatial Light Modulators and Applications 1988 Technical Digest Series, vol. 8, Postconference Edition, pp. cover, 107-110, Jun. 15-17, 1988.

Hosokawa, Kazuo et al., "Droplet-Based Nano/Picoliter Mixer Using Hydrophobic Microcapillary Vent," 1999 IEEE International Conference on Micro Electro Mechanical Systems, Technical Digest, pp. 388-393, 1999.

Hosokawa, Kazuo et al., "Handling Of Picoliter Liquid Samples In A Poly(dimethylsiloxane)-Based Microfluidic Device," Analytical Chemistry, vol. 71, No. 20, pp. 4781-4785, Oct. 15, 1999.

Ikuta, Koji et al., "Three Dimensional Micro Integrated Fluid Systems (MIFS) Fabricated By Stereo Lithography," IEEE, pp. 1-6, 1994.

Jacobson, Stephen C. et al., "High-Speed Separations On A Microchip," Analytical Chemistry, vol. 66, No. 7, pp. 1114-1118, Apr. 1, 1994.

Jacobson, Stephen C. et al., "Microfluidic Devices For Electrokinetically Driven Parallel And Serial Mixing," Analytical Chemistry, vol. 71, No. 20, pp. 4455-4459, Oct. 15, 1999.

Jerman, Hal, "Electrically-Activated, Normally-Closed Diaphragm Valves," Transducers '91, 1991 International Conference on Solid-State Sensors and Actuators, pp. cover, 1045-1048, 1991.

Jo, Byung-Ho et al., "Fabrication Of Three-Dimensional Microfluidic Systems By Stacking Molded Polydimethylsiloxane (PDMS) Layers" SPIE, vol. 3877, pp. 222-229, Sep. 1999.

Jo, Byung-Ho et al., "Three-Dimensional Micro-Channel Fabrication In Polydimethylsiloxane (PDMS) Elastomer," Journal of Microelectromechanical Systems, vol. 9, No. 1, pp. 76-81, Mar. 2000.

Jung, D. R. et al., "Chemical And Physical Interactions At Metal/Self-Assembled Organic Monolayer Interfaces," pp. 1-54, 1994.

Kagan, C. R., "Organic-Inorganic Hybrid Materials As Semiconducting Channels In Thin-Film Field-Effect Transistors," Science, vol. 286, pp. 945-947, Oct. 29, 1999.

Kapur, Ravi et al., "Fabrication And Selective Surface Modification Of 3-Dimensionally Textured Biomedical Polymers From Etched Silicon Substrates," Journal of Biomedical Materials Research, vol. 33, pp. 205-216, 1996.

Kawano, Yasushi et al., "Rapid Isolation And Identification Of Staphylococcal Exoproteins By Reverse Phase Capillary High Performance Liquid Chromatography-Electrospray Ionization Mass Spectrometry," FEMS Microbiology Letters, vol. 189, pp. 103-108, 2000.

Kenis, Paul J. A. et al., "Microfabrication Inside Capillaries Using Multiphase Laminar Flow Patterning," Science, vol. 285, pp. 83-85, Jul. 2, 1999.

Khoo, Melvin et al., "A Novel Micromachined Magnetic Membrane Microfluid Pump," pp. 1-4, no date.

Kim, Enoch et al., "Micromolding In Capillaries: Applications In Materials Science," J. Am. Chem. Soc., vol. 118, No. 24, pp. 5722-5731, 1996.

Kim, Enoch et al., "Polymer Microstructures Formed By Moulding In Capillaries," Nature, vol. 376, pp. 581-584, Aug. 17, 1995.

Kirk-Othmer, "Concise Encyclopedia of Chemical Technology," John Wiley & Sons, 5 pages, no date.

Kopp, Martin U. et al., "Chemical Amplification: Continuous-Flow PCR On A Chip," Science, vol. 280, pp. 1046-1048, May 15, 1998.

Kuhn, Lawrence et al., "Silicon Charge Electrode Array For Ink Jet Printing," IEEE Transactions on Electron Devices, vol. ED-25, No. 10, pp. 1257-1260, Oct. 1978.

Kumar, Amit et al., "Features Of Gold Having Micrometer To Centimeter Dimensions Can Be Formed Through A Combination Of Stamping With An Elastomeric Stamp And An Alkanethiol 'Ink' Followed By Chemical Etching," Appl. Phys. Lett., vol. 63, No. 14, pp. 2002-2004, Oct. 4, 1993.

Kumar, Amit et al., "Patterning Self-Assembled Monolayers: Applications In Materials Science," Langmuir, vol. 10, pp. 1498-1511, 1994.

Lagally, Eric T. et al., "Fully Integrated PCR-Capillary Electrophoresis Microsystem For DNA Analysis," Lab On A Chip, vol. 1, pp. 102-107, 2001.

Lagally, Eric T. et al., "Monolithic Integrated Microfluidic DNA Amplification And Capillary Electrophoresis Analysis System," Sensors and Actuators B, vol. 63, pp. 138-146, 2000.

Lagally, E. T. et al., "Single-Molecule DNA Amplification And Analysis In An Integrated Microfluidic device, "Analytical chemistry, vol. 73, No. 3, pp. 565-570, Feb. 1, 2001.

Lammerink, T. S. J. et al., "Modular Concept For Fluid Handling Systems," IEEE, pp. 389-394, 1996.

Lazar, Iulia M. et al., "Novel Microfabricated Device For Electrokinetically Induced Pressure Flow And Electrospray Ionization Mass Spectrometry," Journal of Chromatography A, vol. 892, pp. 195-201, 2000.

Li, Jianjun et al., "Integration Of Microfabricated Devices To Capillary Electrophoresis-Electrospray Mass Spectrometry Using A Low Dead Volume Connection: Application To Rapid Analyses Of Proteolytic Digests," Analytical Chemistry, vol. 71, No. 15, pp. 3036-3045, Aug. 1, 1999.

Li, Paul C. H. et al., "Transport, Manipulation, And Reaction Of Biological Cells On-Chip Using Electrokinetic Effects," Analytical Chemistry, vol. 69, No. 8, pp. 1564-1568, Apr. 15, 1997.

Licklider, Larry et al., "A Micromachined Chip-Based Electrospray Source For Mass Spectrometry," Analytical Chemistry, vol. 72, No. 2, pp. 367-375, Jan. 15, 2000.

Lin, L. Y. et al., "Free-Space Micromachined Optical Switches For Optical Networking," IEEE Journal of Selected Topics in Quantum Electronics, vol. 5, No. 1, pp. 4-9, Jan. 1999.

Lin, Yuehe et al., "Laser Micromachined Isoelectric Focusing Device On Polymer Substrate For Electrospray Mass Spectrometry," SPIE, vol. 3877, pp. 28-35, Sep. 1999.

Liu, Hanghui et al., "Development Of Multichannel Devices With An Array Of Electrospray Tips For High-Throughput Mass Spectrometry," Analytical Chemistry, vol. 72, No. 14, pp. 3303-3310, Jul. 15, 2000.

Lötters, J C et al., "The Mechanical Properties Of The Rubber Elastic Polymer Polydimethylsiloxane For Sensor Applications," J. Micromech. Microeng., vol. 7, pp. 145-147, 1997.

Lucy, Charles A. et al., "Characterization Of The Cationic Surfactant Induced Reversal Of Electroosmotic Flow In Capillary Electrophoresis," Anal. Chem., vol. 68, pp. 300-305, 1996.

Maluf, N., "An Introduction To Microelectromechanical Systems Engineering," Artech House Publishers, Boston London, pp. 42-45, Dec. 1999.

Manz, A. et al., "Micromachining Of Monocrystalline Silicon And Glass For Chemical Analysis Systems," Trends in Analytical Chemistry, vol. 10, No. 5, pp. 144-149, 1991.

Marshall, Sid, "Fundamental Changes Ahead For Lab Instrumentation," R&D Magazine, 5 pages, Feb. 1999.

Marsili, Ray, "Lab-On-A-Chip Poised To Revolutionize Sample Prep," R&D Magazine, 5 pages, Feb. 1999.

McDonald, J. Cooper et al., "Fabrication Of Microfluidic Systems In Poly(dimethylsiloxane)," Electrophoresis, vol. 21, pp. 27-40, 2000.

Muller, Richard S. et al., "Surface-Micromachined Microoptical Elements And Systems," Proceedings of the IEEE, vol. 86, No. 8, pp. 1705-1720, Aug. 1998.

New Objective, Inc., "What Is Electrospray," www.newobjective.com/electrospray/electrospray.html, 4 pages, 1999.

Oleschuk, Richard D. et al., "Analytical Microdevices For Mass Spectrometry," Trends In Analytical Chemistry, vol. 19, No. 6., pp. 379-388, 2000.

Olsson, Anders et al., "Simulation Studies Of Diffuser And Nozzle Elements For Valve-Less Micropumps," Transducers '97, 1997 International Conference on Solid-State Sensors and Actuators, Chicago, Illinois, pp. 1039-1042, Jun. 16-19, 1997.

Pethig, Ronald et al., "Applications Of Dielectrophoresis In Biotechnology," Tibtech, vol. 15, pp. 426-432, Oct. 1997.

Protana website, "NanoES Products," www.protana.com/products/default.asp, 3 pages, Sep. 19, 2000.

Qin, Dong et al., "Elastomeric Light Valves," Adv. Mater., vol. 9, No. 5, pp. 407-410, 1997.

Qin, Dong et al., "Photolithography With Transparent Reflective Photomasks," J. Vac. Sci. Technol. B, vol. 16, No. 1, pp. 98-103, Jan. 1998.

Quake, Stephen R. et al., "From Micro- To Nanofabrication With Soft Materials," Science, vol. 290, pp. 1536-1540, Nov. 24, 2000.

Rapp, R. et al., "LIGA Micropump For Gases And Liquids," Sensors and Actuators A, vol. 40, pp. 57-61, Jan. 1994.

Roylance, Lynn Michelle et al., "A Batch-Fabricated Silicon Accelerometer," IEEE Transactions on Electron Devices, vol. ED-26, No. 12, pp. 1911-1917, Dec. 1979.

Sandia National Laboratories, "Electro Microfluidic Dual In-Line Package (EMDIP)," 2 pages, no date.

Sanjoh, Akira et al., "Spatiotemporal Protein Crystal Growth Studies Using Microfluidic Silicon Devices," Journal of Crystal Growth, vol. 196, pp. 691-702, 1999.

Schasfoort, Richard B. M. et al., "Field-Effect Flow Control For Microfabricated Fluidic Networks," Science, vol. 286, pp. 942-945, Oct. 29, 1999.

Schomburg, W. K. et al., "Fabrication Of Polymer Microcomponents With The AMANDA-Process," New Materials and Directions, Eurosensors XII, pp. 711-714, Sep. 13-16, 1998.

Schueller, Olivier J. A. et al., "Fabrication Of Glassy Carbon Microstructures By Soft Lithography," Sensors and Actuators A, vol. 72, pp. 126-139, 1999.

Shevchenko, Andrej et al., "Rapid 'de Novo' Peptide Sequencing By A Combination Of Nanoelectospray, Isotopic Labeling And A Quadrupole/Time-Of-Flight Mass Spectometer," Rapid Communications in Mass Spectrometry, vol. 11, pp. 1015-1024, 1997.

Shinohara, Jun et al., "A High Pressure-Resistance Micropump Using Active And Normally-Closed Valves" [IEEE pp. 86-91, 2000.].

Shoji, Shuichi, "Fluids For Sensor Systems," Topics in Current Chemistry, vol. 194, pp. 163-188, 1998.

Shoji, Shuichi et al., "Smallest Dead Volume Microvalves For Integrated Chemical Analyzing Systems," Transducers '91, 1991 International Conference on Solid-State Sensors and Actuators, San Francisco, California, pp. cover, 1052-1055, 1991.

Smits, J.G., "Piezoelectric Micropump With Three Valves Working Peristaltically," Sensors and Actuators, vol. A21-A23, pp. 203-206, 1990.

Sohn, L. L. et al., "Capacitance Cytometry: Measuring Biological Cells One By One," PNAS, vol. 97, No. 20, pp. 10687-10690, Sep. 26, 2000.

Thompson, L. F. et al., "Introduction To Microlithography," 185th Meeting of the American Chemical Society, Seattle, WA, pp. 2 cover pages, 1-13, Mar. 20-15, 1983.

Thorsen, Todd et al., "Dynamic Pattern Formation In A Vesicle-Generating Microfluidic Device," Physical Review Letters, vol. 86, No. 18, pp. 4163-4166, Apr. 30, 2001.

Tufte, O. N. et al., "Silicon Diffused-Element Piezoresistive Diaphragms," Journal of Applied Physics, vol. 33, No. 11, pp. 3322-3327, Nov. 1962.

Ulmann's Encyclopedia of Industrial Chemistry, Sections 6 to 6.3, Topic: Carbon Black, Sixth Edition, 7 pages, 1999.

Unger, Marc A. et al., "Monolithic Microfabricated Valves And Pumps By Multilayer Soft Lithography," Science, vol. 288, pp. 113-116, Apr. 7, 2000.

Van De Pol, F.C.M. et al., "A Thermo-Pneumatic Actuation Principle For A Microminiature Pump And Other Micromechanical Devices," Sensors and Actuators, vol. 17, Nos. 102, pp. 139-143, May 3, 1989.

Van De Pol, F.C.M. et al., "Micro Liquid Handling Devices—A Review," Micro Systems Technologies, vol. 90, pp. 799-805, 1990.

Van Den Berg, A. et al., "Micro Total Analysis Systems," Proceedings of the μTAS '94 Workshop, University of Twente, The Netherlands, 17 pages, Nov. 21-22, 1994.

Verpoorte, Elisabeth M. J. et al., "Three-Dimensional Micro Flow Manifolds For Miniaturized Chemical Analysis Systems," J. Micromech. Microeng., vol. 7, pp. 246-256, 1994.

Veider, Christian et al., "A Pneumatically Actuated Micro Valve With A Silicon Rubber Membrane For Integration With Fluid Handling Systems," Transducers '95, 8th International Conference on Solid-State Sensors and Actuators and Eurosensors IX, Stockholm, Sweden, pp. 284-286, Jun. 25-29, 1995.

Washizu, Masao et al., "Molecular Dielectrophoresis Of Biopolymers," IEEE Transactions on Industry Applications, vol. 30, No. 4, pp. 835-843, Jul. 1994.

Wfigl, Bernhard H., "Microfluidics-Based Lab-On-A-Chip Systems," IVD Technology Magazine, 8 pages, Nov./Dec. 2000.

Whitesides, George M. et al., "Flexible Methods For Microfluidics," Physics Today, pp. 42-48, Jun. 2001.

Whitesides, George M. et al., "Soft Lithography In Biology And Biochemistry," Annu. Rev. Biomed. Eng., vol. 3, pp. 335-373, 2001.

Wilbur, James L. et al., "Lithographic Molding: A Convenient Route To Structures With Sub-Micrometer Dimensions," Adv. Mater., vol. 7, No. 7, pp. 649-652, 1995.

Wilm, Matthias et al., "Femtomole Sequencing Of Proteins From Polyacrylamide Gels By Nano-Electrospray Mass Spectrometry," Nature, vol. 379, pp. 466-469, Feb. 1, 1996.

Xia, Younan et al., "Complex Optical Surfaces Formed By Replica Molding Against Elastomeric Masters," Science, vol. 273, pp. 347-349, Jul. 19, 1996.

Xia, Younan et al., "Micromolding Of Polymers In Capillaries: Applications In Microfabrication," Chem. Mater., vol. 8, No. 7, pp. 1559-1566, 1996.

Xia, Younan et al., "Reduction In The Size Of Features Of Patterned SAMs Generated By Microcontact Printing With Mechanical Compression Of The Stamp," Adv. Mater., vol. 7, No. 5, pp. 471-473, 1995.

Xia, Younan et al., "Soft Lithography," Angew. Chem. Int. Ed., vol. 37, pp. 551-575, 1998.

Xu, Bing et al., "Making Negative Poisson's Ratio Microstructures By Soft Lithography," Adv. Mater., vol. 11, No. 14, pp. 1186-1189, 1999.

Xu, Jingdong et al., "Room-Temperature Imprinting Method For Plastic Microchannel Fabrication," Analytical Chemistry, vol. 72, No. 8, pp. 1930-1933, Apr. 15, 2000.

Xue, Qifeng et al., "Integrated Multichannel Microchip Electrospray Ionization Mass Spectrometry: Analysis Of Peptides From On-Chip Tryptic Digestion of Melittin," Rapid Communications In Mass Spectrometry, vol. 11, 1253-1256, 1997.

Xue, Qifeng et al., "Multichannel Microchip Electrospray Mass Spectrometry," Analytical Chemistry, vol. 69, No. 3, pp. 426-430, Feb. 1, 1997.

Yang, Xing et al., "A Low Power MEMS Silicone/Parylene Valve," Solid-State Sensor and Actuator Workshop, Hilton Head Island, South Carolina, 4 pages, Jun. 7-11, 1998.

Yang, Xing et al., "A MEMS Thermopneumatic Silicone Membrane Valve," IEEE 10th Annual International Workshop of Micro Electro Mechanical Systems, Nagoya, Japan, pp. cover, 114-118, Jan. 26-30, 1997.

Yazdi, Navid et al., "Micromachined Inertial Sensors," Proceedings of IEEE, vol. 86, No. 8, pp. 1640-1659, Aug. 1998.

Young et al., Contoured elastic-membrane microvalves for microfluidic network Journal of Biomechanical Engineering, vol. 121, pp. 2-6, Feb. 1999.

Zengerle, R. et al., "A Micro Membrane Pump With Electrostatic Actuation," Micro Electro Mechanical Systems '92, Travemünde, Germany, pp. 19-24, Feb. 4-7, 1992.

Zengerle, R. et al., "Performance Simulation Of Microminiaturized Membrane Pumps," 7th International Conference on Solid-State Sensors and Actuators, Yokohama, Japan, pp. 2 cover pages, 106-109, Jun. 7-10, 1993.

Zhang, B. et al., "Microfabricated Devices For Capillary Electrophoresis-Electrospray Mass Spectrometry," Analytical Chemistry, vol. 71, No. 15, pp. 3258-3264, Aug. 1, 1999.

* cited by examiner

ELECTROSTATIC VALVES FOR MICROFLUIDIC DEVICES

CROSS-REFERENCE TO RELATED APPLICATION

This nonprovisional patent application claims priority from provisional patent application No. 60/246,469, filed Nov. 6, 2000. The text of this provisional patent application is hereby incorporated by reference.

STATEMENT AS TO RIGHTS TO INVENTIONS MADE UNDER FEDERALLY SPONSORED RESEARCH AND DEVELOPMENT

Work described herein has been supported, in part, by Air Force Research Organization grant DAAD 19-00-1-0392. The United States Government may therefore have certain rights in the invention.

BACKGROUND OF THE INVENTION

Pumps and valves for transporting and manipulating liquids in microfluidic devices are essential for developing lab on a chip technology. Various approaches to designing micro-fluidic pumps and valves have been attempted. However, each of these conventional approaches suffers from its own limitations.

The two most common methods of producing microelectromechanical (MEMS) structures such as pumps and valves are silicon-based bulk micro-machining (which is a subtractive fabrication method whereby single crystal silicon is lithographically patterned and then etched to form three-dimensional structures), and surface micro-machining (which is an additive method where layers of semiconductor-type materials such as polysilicon, silicon nitride, silicon dioxide, and various metals are sequentially added and patterned to make three-dimensional structures).

A limitation of the first approach of silicon-based micro-machining is that the stiffness of the semiconductor materials used may necessitate high actuation forces, which in turn result in large and complex designs. In fact, both bulk and surface micro-machining methods are limited by the stiffness of the materials used. In addition, adhesion between various layers of the fabricated device is also a problem. For example, in bulk micro-machining, wafer bonding techniques must be employed to create multilayer structures. On the other hand, when surface micro-machining, thermal stresses between the various layers of the device limits the total device thickness, often to approximately 20 µm. Using either of the above methods, clean room fabrication and careful quality control are required.

Pressure driven valves for devices made out of soft polymers (e.g. PDMS) are described in U.S. Nonprovisional Patent Application No. 09/605,520, incorporated herein by reference for all purposes herein.

From the above, it is seen that utilization of structures and methods for efficient and effective movement of fluids are highly desired.

SUMMARY OF THE INVENTION

Embodiments of the present invention relate to electrostatically actuated valve structures formed in elastomeric material. Specifically, a flow channel present in an elastomer block may be opened or closed by the application of a potential difference. In one embodiment of a valve structure in accordance with the present invention, a flexible conductive wire structure is patterned by lithography and etching of a copper/polyimide laminate. The patterned copper wire is positioned on top of elastomer material making up a ceiling of an underlying flow channel. A gold electrode forms the floor of the flow channel. Application of a potential difference between the wire and the underlying gold electrode drives the flexible wire and the elastomer ceiling of the flow channel down into the flow channel, obstructing the flow channel. Removal of the potential difference causes the wire/elastomer structure to relax back into its initial position out of the flow channel, opening the valve.

In an alternative valve structure in accordance with the present invention, flexible patterns of aluminum wire are formed from strips of aluminum/Mylar(®) laminate layers that are cut out from a larger sheet of laminate and then positioned on opposite sides of a control channel, the control channel overlying and connected to the flow channel. Application of a potential difference drives the wires together, closes the control channel, and also brings together the walls of the underlying flow channel to close the valve.

These and other embodiments of the present invention, as well as its advantages and features are described in more detail in conjunction with the text below and the attached Figures.

DESCRIPTION OF THE SPECIFIC EMBODIMENTS

Figure 1A:
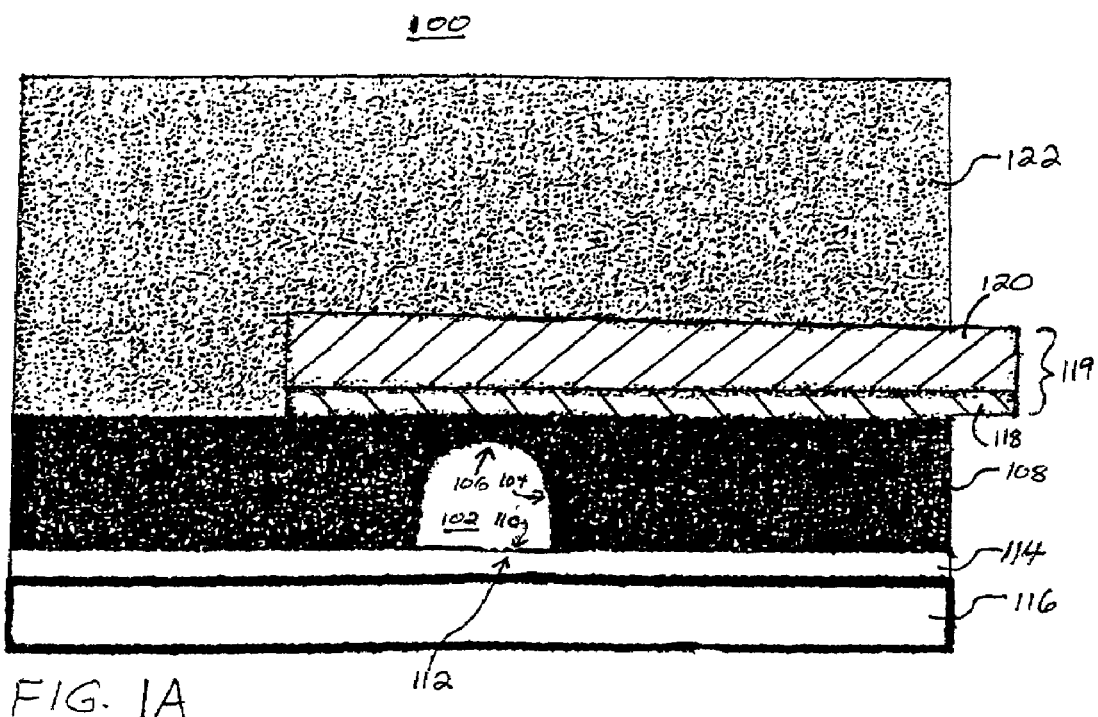
FIG. 1A shows a simplified cross-sectional view of one embodiment of an electrostatically-actuated valve structure in accordance with the present invention.

The subject matter of the present application is related to U.S. nonprovisional patent application No. 09/605,520, filed Jun. 27, 2000. The content of this nonprovisional patent application is incorporated by reference herein.

As described above, it is desirable to find alternative valve structures and methods of their activation for use in various microfluidic applications, for example implementable high density microfluidic devices. Embodiments of the present invention therefore relate to methods and structures for closing channels in elastomeric materials by electrostatic action utilizing flexible conductive materials (e.g. copper/polyimide or aluminum/Mylar(®) laminates) that can readily be patterned for a variety of applications.

I. First Embodiment of a Valve Structure in Accordance with the Present Invention A. Sources of Materials RTV 615(™) polydimethylsulfoxide (PDMS) was obtained from General Electric. Pyralux(®) LF 9110 copper/polyimide laminate was obtained from DuPont. Photoresist 5740(™) and Developer CD 20 (™) were obtained from Shipley Microelectronics. Trimethylchlorosilane (TMCS) and FeCl$_3$ were obtained from Sigma. Hexamethyldisilazine (HMDS) was obtained from ShinEtsuMicrosi of Phoenix, Ariz.

B. Fabrication of Mold

A silicon wafer was exposed to HMDS, and then Photoresist 5740 was spun upon a silicon wafer at 2000 rpm for 60 sec. The photoresist/wafer combination was then baked at 95° C. for 60 min. The coated wafer was exposed to UV light through a mask for 2.3 min. to create exposed photoresist regions having widths varying between 30-250 μm. Development of the photoresist with 20% CD20(™) resulted in removal of unexposed photoresist. The wafer and patterned exposed photoresist features formed thereon were hard baked at 130° C. for 30 min. on a hot plate, causing reflow of the photoresist and resulting in rounding of the raised photoresist features.

C. Fabrication of Flow Channel-containing Structure from the Mold

The silicon wafer bearing the raised, rounded photoresist features was next utilized as a mold to fabricate the elastomeric channel-containing structure. The raised photoresist features were treated with TMCS in the gas phase. RTV 615(™) PDMS was mixed at 30:1 (component A: component B) and then spun onto the mold at 2000 rpm for 45 sec., resulting in formation of a PDMS layer having a thickness of around 20 μm over the mold. This PDMS layer was then hardened by baking for 90 min. at 85° C.

D. Fabrication of Flexible Electrically-conductive Wires

A sheet of Pyralux(®) LF9110 laminate having a copper side and a polyimide side was treated with HMDS, and afterwards Photoresist 5740(™) was spun on to the copper side at 2000 rpm for 60 sec.

After baking at 95° C. for 60 min, the photoresist on the copper side of the Pyralux(®) laminate was exposed to light through a mask bearing the control wire pattern. After developing for 60 sec. with 20% CD20(™) to remove the unexposed photoresist, the copper of the laminate exposed during development was etched with FeCl$_3$ solution having a concentration of 1.4 g/ml. Residual developed photoresist overlying the remaining copper wires was removed using acetone to leave the patterned copper control lines lying on top of the polyimide layer of the laminate.

E. Fabrication of Valve Structure from Channel-containing Structure and Flexible Electrically Conductive Wires The electrically conducting copper control lines were cut out from the larger laminate sheet, turned over, and then placed flat, copper side down, over the 30:1 PDMS channel-containing structure, such that at crossover points the copper wires were positioned orthogonal to the underlying flow channels. Portions of the bare polyimide layer from which copper had previously been removed were flexible and conformed over the copper wires to directly contact the surface of the 30:1 PDMS, such that few if any voids between the polyimide and 30:1 PDMS were created.

Next, 3:1 (component A: component B) PDMS was poured on top of the polyimide layer of the laminate, and the entire combined device was baked for additional 90 min. to bind the 3:1 PDMS elastomer to the polyimide. The purpose of the additional (3:1) PDMS layer was to passivate the underlying flow channel/wire structure.

The entire device was then removed from the mold and transferred to a glass slide bearing a patterned gold layer having a thickness of 5000 Å.

Figure 1B:
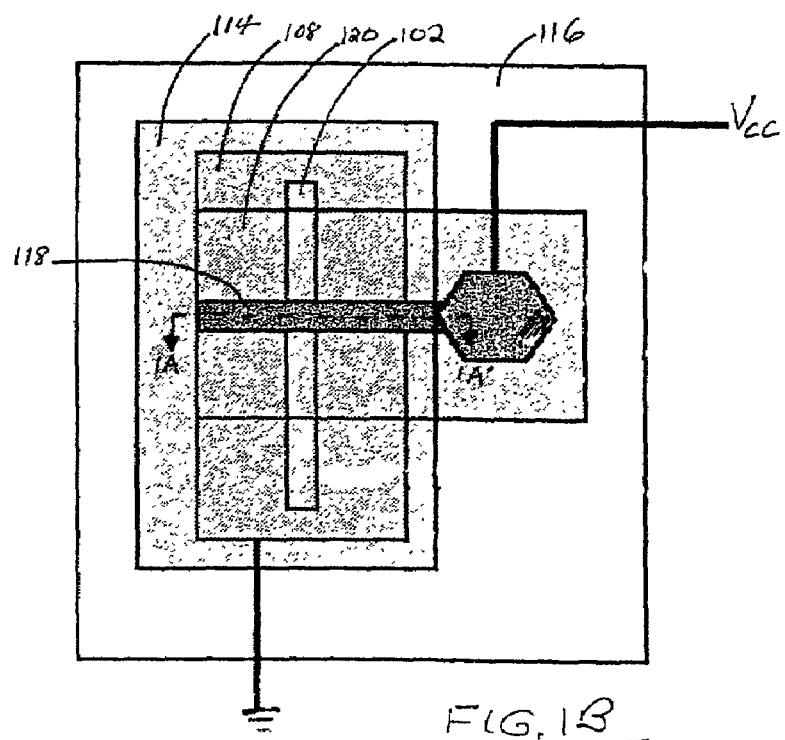
FIG. 1B shows a simplified plan view of the electrostatically actuated valve structure of FIG. 1A.

FIG. 1A shows a simplified cross-sectional view of the resulting electrostatically-actuated valve structure. FIG. 1B shows a simplified plan view of the electrostatically actuated valve structure.

Valve structure 100 includes flow channel 102 having walls 104 and arched ceiling 106 formed from 30:1 PDMS elastomer material 108. Arched ceiling 106 reflects the rounded profile of the raised features on the mold created by reflowing the photoresist material, as described above under section I.B.

Floor 110 of flow channel 102 is formed from electrode 112 that is part of gold layer 114 patterned on glass slide 116. Copper wire 118 overlies ceiling portion 106 of elastomer layer 108 and polyimide layer 120 overlies copper wire 118.

During operation of valve structure 100, a voltage is applied to copper wire 118. This voltage creates an attraction between copper wire 118 and underlying gold electrode 112, such that copper wire 118 and arched ceiling portion 106 of 30:1PDMS elastomer 108 are driven downward into flow channel 102, closing valve structure 100. Upon cessation of application of voltage to copper wire 118, the attractive force between copper wire 118 and underlying gold electrode 112 is no longer present, and copper wire 118 and arched membrane portion 106 of 30:1 PDMS elastomer 108 relax upward out of flow channel 102, opening valve structure 100.

The response time for closing of the valve structure shown in FIGS. 1A-1B having a flow channel of width 100 μm was less than 100 ms. The time for relaxation and opening of the valve structure of FIGS. 1A-1B was around 3 seconds following the cessation of the applied voltage. The substantially longer time required for the valve to open following actuation may be due to actuation of valves having empty air-filled flow channels. No change in the performance of the valve structure of FIGS. 1A-1B was observed after 100 close/open cycles.

Figure 2A:
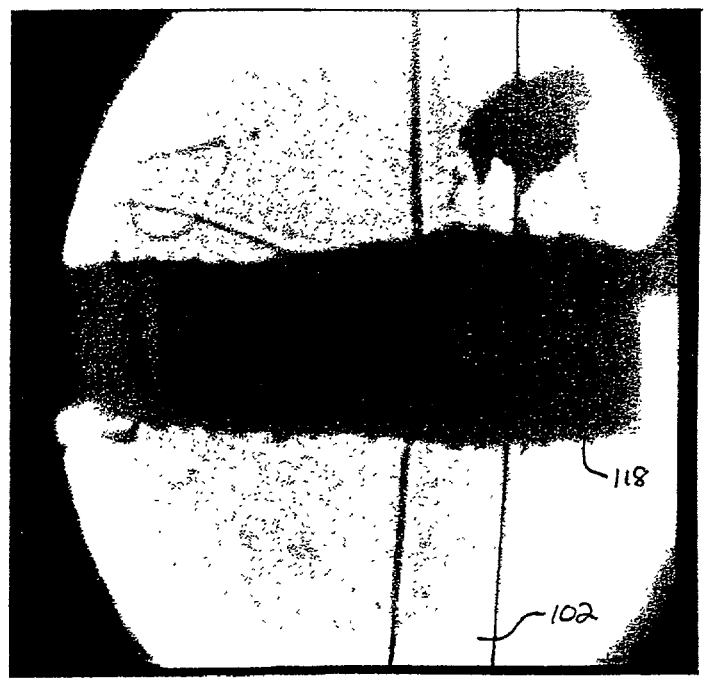
FIG. 2A shows a microscope plan view of a valve structure in an nonactuated state having a channel with of 100 µm underlying an orthogonally-positioned copper wire having a width of 200 µm.
Figure 2B:
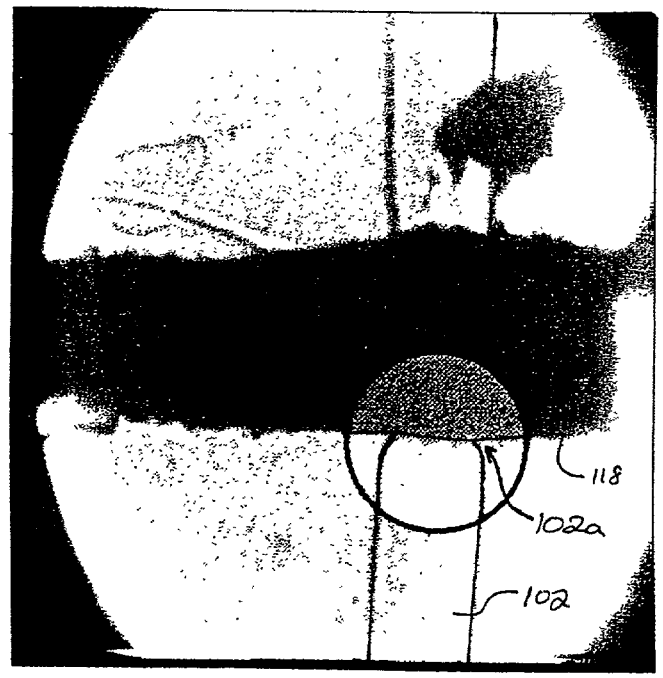
FIG. 2B shows a microscope plan view of the valve structure of FIG. 2A in an actuated state.

FIG. 2A shows a microscope plan view of a nonactuated valve structure having a width of flow channel 102 of width 100 μm underlying an orthogonally-positioned copper wire 118 having a width of 200 μm. FIG. 2B shows a microscope plan view of the valve structure of FIG. 2A that is actuated by applying a voltage of 1200V to copper wire 118. FIG. 2B clearly shows deformation (closing) at crossover portion 102a of flow channel 102 resulting from application of a potential difference of 1200V between copper wire 118 and underlying gold electrode 112.

The valve structures in accordance with embodiments of the present invention offer a number of advantages. One advantage is the possibility of utilizing optics to determine the state of the valve. Specifically, a laser beam can be aimed at the elastomer surface at the location of the wire/channel cross-over point. By measuring the deflection of the laser beam, flexion of the copper wire and the underlying elastomer channel forming the roof of the flow channel, and hence the degree of openness of the valve structure, can be determined.

In addition to utilizing optics to detect valve position, flexion of the copper wire and underlying elastomer material as described above could also be employed to create a micromachined switching mirror. Specifically, the wire/channel cross-over point could be formed as a reflective, micro-mirror surface that serves as a target for a light source such as a laser beam. Actuation of the valve would alter the orientation of the micro-mirror surface and change the angle of reflection of a beam aimed at the micro-mirror. Such a switching mirror would have potential applications in a variety of optical display and networking applications.

Another advantage of embodiments of valve structures in accordance with the present invention is their low price and ready integration with existing technology. Specifically, elastomer materials in which the flow channels are formed are readily available in bulk quantities. Moreover, the photoresist and photoresist development chemicals utilized to create the mold and to pattern the copper wire from the laminate sheet are widely used in conventional semiconductor processing.

Figure 3:
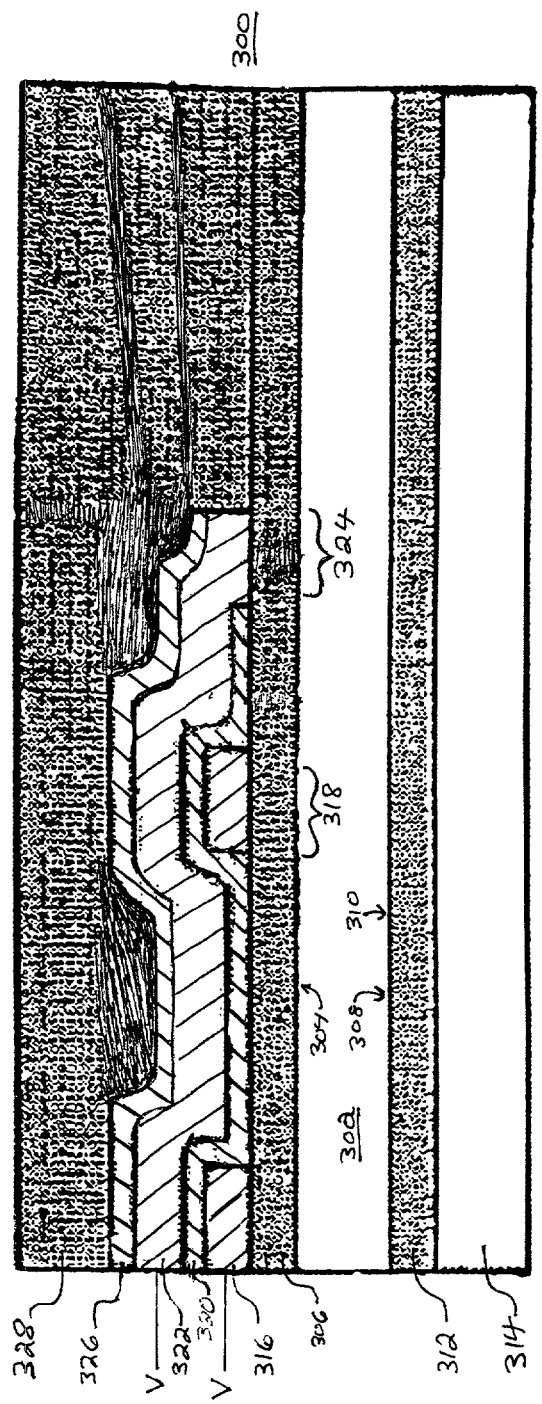
FIG. 3 shows a cross-sectional view of an embodiment of a device containing multiple addressable valves in accordance with the present invention.

Yet another important advantage of embodiments of the present invention is the ability to form operational multi-valve structures in which the electrically conducting control wires cross over one another. This is illustrated below in conjunction with FIG. 3, which shows a cross-sectional view of an embodiment of a device containing multiple addressable valves in accordance with the present invention.

Multiple valve device 300 includes flow channel 302 having walls (not shown in FIG. 3 cross-section) and ceiling 304 formed from 30:1 PDMS elastomer material 306. Floor 308 of flow channel 302 is formed from electrode 310 that is part of gold layer 312 patterned over glass slide 314. First copper wire 316 of the first laminate overlies flow channel 302 at first valve location 318, and first polyimide layer 320 overlies first copper wire 316.

Second copper wire 322 of the second laminate overlies first polyimide layer 320 and overlies 30:1 PDMS elastomer material 306 at second valve location 324. Second polyimide layer 326 overlies second copper wire 322 of the second laminate. 3:1 RTV PDMS 328 overlies second polyimide layer 326.

Because of the highly insulating properties of first polyimide layer 320, a voltage applied to second copper wire 322 will not affect the application of voltage to underlying first copper wire 316, and vice versa. In this manner, a multilayer structure of overlapping electrical wires may be fabricated utilizing successive layers of patterned laminate material, analogous to formation of multilayer interconnect metallization structures of integrated circuits.

II. Second Embodiment of a Valve Structure in Accordance with the Present Invention While embodiments of valve structures described above in connection with FIGS. 1A-3 utilize flexible electrical control wires fabricated from copper/polyimide laminate layers overlying the flow channel, the present invention is not limited to this particular structure. Other structures and/or materials could be utilized to control the flow liquid and gaseous materials, and still remain within the scope of the present invention.

For example, in both embodiments described above in conjunction with FIGS. 1A-3, an electric field is applied across the flow channel during actuation of the valve structure. However, in an electric field ions present in the flow channel may migrate to a side of the flow channel proximate to one of the charged poles (wire or electrode). This possible migration of charged species could affect the magnitude of the electrostatic force applied to the valve.

In addition, substances in the flow channel that are susceptible to electrochemical reaction (e.g. electrolysis) may undergo electrolysis during actuation due to contact with the electrode and the potential within the flow channel.

Therefore, in accordance with an alternative embodiment of the present invention, the flow channel of a valve structure is closed by application of an electrostatic force across a control channel overlying the flow channel, rather than across the flow channel itself. Closing the upper control channel in turn forces the flow channel to close. Operation and fabrication of this alternative valve structure is illustrated in detail in conjunction with FIGS. 4A-4C below.

A. Sources of Materials

RTV 615(™) PDMS was obtained from General Electric. Aluminum/Mylar(®)laminate (10 µm, 12 Ohm/in$^2$ was obtained from Steinerfilm, Inc. of Williamstown, Mass. Photoresist 5740(™) and Developer CD 20(™) were obtained from Shipley Microelectronics. Trimethylchlorosilane (TMCS) was obtained from Sigma. HMDS was obtained from ShinEtsuMicrosi of Phoenix, Ariz. Silver epoxy was obtained from Chemtronics of Kennesaw, Ga.

B. Fabrication of First Mold for Flow Channel-containing Portion

A silicium wafer was treated with HMDS in the gas phase for 1 min. Photoresist 5740 was spun on the wafer at 2000 rpm for 60 sec. and baked for 60 min. at 90° C. After exposing with UV through a mask containing the desired pattern for 2.3 min. the photoresist was developed using 20% Developer CD-30(™) to produce raised line structures of between 30 and 250 µm in width. In order to round these photoresist features, the mold was then heated for 30 min. at 130° C. on a hot plate.

C. Fabrication of Flow Channel-containing Portion

30:1 (component A: component B) RTV 615(™) was spun at 2000 rpm for 45 sec. on the first mold fabricated above after treatment with TMCS in the gas phase. The wafer was then baked for 60 minutes at 80° C.

2 mm wide strips of Mylar(®)/Aluminum laminate were cut out by hand from a larger laminate sheet and then placed, Aluminum side up, on top of the 30:1 elastomer, orthogonal to the underlying flow channel. A second thin layer of 30:1 (component A: component B) RTV 615(™) was spun at 4000 rpm for 30 sec. over the aluminum, and the wafer was baked again for 60 min. at 80° C.

D. Fabrication of Control Channel-containing Portion

3:1 (component A: component B) RTV 615(™) was spun at 2000 rpm for 45 sec. on a second mold bearing a pattern of raised lines of photoresist having a width of 100 µm. These raised lines are formed by lithography in the same manner as described above for formation of the first mold, and the raised lines occupy the space that will later serve as the control channels of the device.

The second wafer was then baked for 60 min. at 80° C. A second set of 2 mm wide strips of Mylar(®)/aluminum laminate were cut out by hand from a larger laminate sheet and placed, aluminum side down, over the control channels. A second 3:1 (component A: component B) RTV 615(™) material was then poured on top of the second wafer (ca. 5 mm) and the second wafer baked again for 60 min. at 80° C.

E. Assembly of Valve Structure

The valve structure in accordance with an alternative embodiment of the present invention was assembled by peeling the control channel-containing portion off of the second wafer, and placing the control channel-containing portion over the flow channel-containing portion. During this step, the control channels and flow channels were oriented orthogonal to one another.

The combined structure was then baked for 1 hour at 80° C. to bind the top 30:1 RTV 615(™) elastomer layer of the flow channel-containing portion to the first 3:1 RTV 615(™) elastomer material of the control channel-containing portion. The complete device was then peeled carefully from the first wafer and placed against a glass slide to enclose the flow channel. Contacts to the aluminum control strips were created utilizing silver epoxy.

Figure 4C:
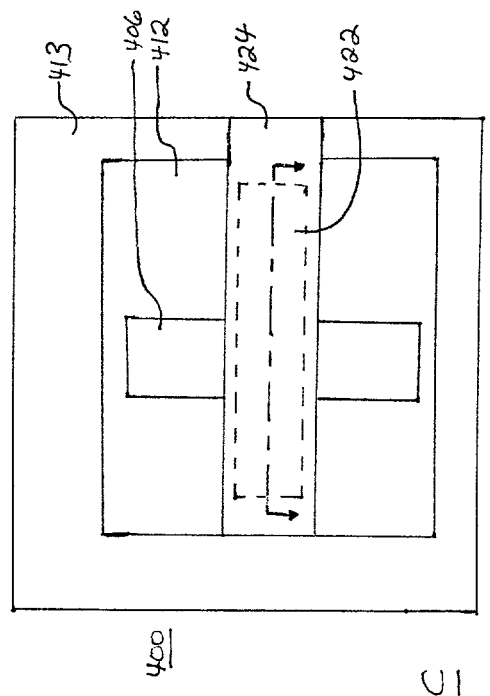
FIG. 4C shows a plan view of the valve structure of FIGS. 4A and 4B.
Figure 4A:
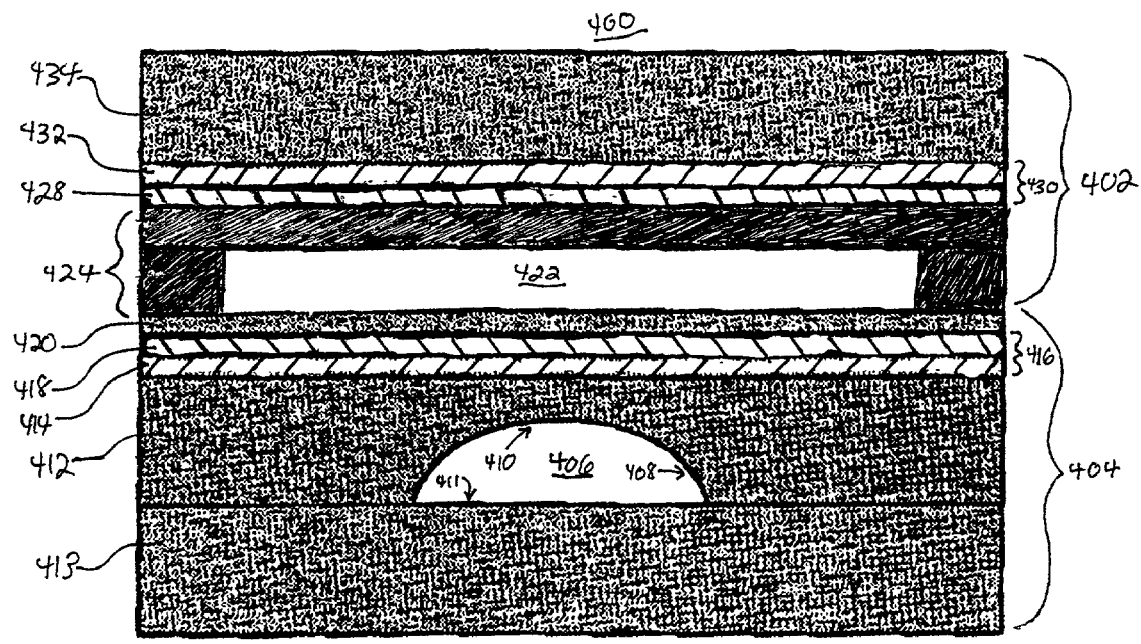
FIG. 4A shows a simplified cross-sectional view of a valve structure in accordance with a second alternative embodiment of the present invention, in a nonactuated state.
Figure 4B:
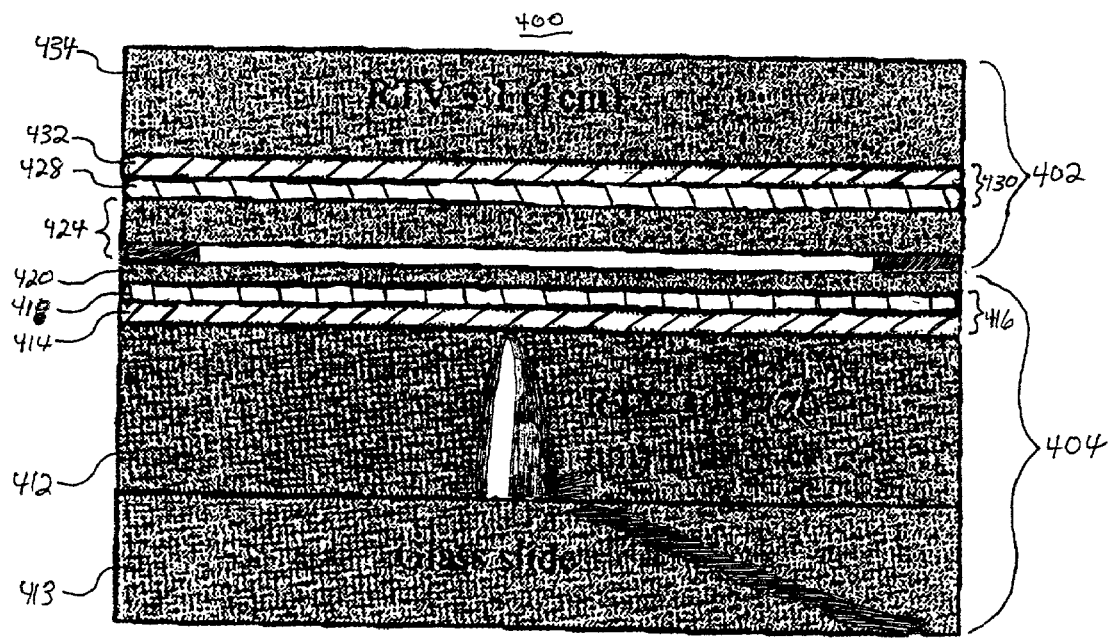
FIG. 4B shows a simplified cross-sectional view of the valve structure of FIG. 4A in an actuated state.

FIG. 4A shows a simplified cross-sectional view of a valve structure in accordance with a second alternative embodiment of the present invention, in a non-actuated state. FIG. 4B shows a simplified cross-sectional view of the valve structure of FIG. 4A in an actuated state. FIG. 4C shows a plan view of the valve structure of FIGS. 4A and 4B.

Valve structure 400 includes control channel-containing portion 402 on top of flow channel-containing portion 404.

Flow channel-containing portion 404 includes flow channel 406 having walls 408 and arched ceiling 410 formed from first 30:1 RTV 615(™) material layer 412 that was poured over the first mold. Arched ceiling 410 reflects the rounded profile of the raised features on the first mold that were created by reflowing the photoresist material, as described above under section II.B. Floor 411 of flow channel 406 is formed from underlying glass plate 413.

First Mylar(®) strip 414 of first laminate 416 overlies RTV 615(™) layer 412, and first aluminum strip 418 overlies first Mylar(®) strip 414. Second RTV 615(™) material layer 420 overlies first aluminum strip 418.

Control channel-containing portion 402 includes control channel 422 having walls and ceiling formed from first 3:1 RTV 615(™) elastomer layer 424, and floor 426 made up of second 30:1 RTV 615(™) material layer 420 of flow channel-containing portion 404. Second aluminum strip 428 of second laminate 430 overlies 3:1 RTV 615(™) material layer 424, and second Mylar(®) strip 432 of second laminate 430 overlies second Aluminum strip 428. Second 3:1 RTV 615(™) material layer 434 overlies second Mylar(®) strip 432.

During actuation of valve 400, a potential difference is applied across first aluminum strip 418 and second aluminum strip 428. The electric field generated by this potential difference creates an attractive actuation force between aluminum strips 418 and 428. As a result, aluminum strips 418 and 428 are drawn toward one another due to flexibility of the elastomer and the freedom of movement imparted by the intervening control channel 422.

Upward movement of first aluminum strip 418 forces walls 408 of flow channel 406 to move together, closing flow channel 406.

Upon cessation of application of the potential difference across aluminum strips 418 and 428, the attractive force between strips 418 and 428 vanishes. Strips 418 and 428 relax back to their initial positions, such that control channel 422 and flow channel 406 open.

By applying 1600V over the control channel, the inventors have discovered that the flow channel is significantly compressed (closed). Times for closing and opening of this alternative valve structure are currently being further investigated.

Given the variety of embodiments of the present invention just described, the above description and illustrations should not be taken as limiting the scope of the present invention which is defined by the appended claims.

What is claimed is:

1. A valve structure comprising:
    a first elastomeric layer defining a flow channel having walls and a deflectable ceiling;
    a first electrode positioned on top of the first elastomeric layer over the deflectable ceiling of the flow channel;
    a second elastomeric layer positioned over the first electrode;
    a third elastomeric layer positioned over the second elastomeric layer, the third elastomeric layer defining a control channel having walls and a ceiling, the second elastomeric layer forming a floor of the control channel; and
    a second electrode positioned on top of the third elastomeric layer over the control channel, such that application of a potential difference between the first electrode and the second electrode drives the first electrode and the second electrode together, causing the walls of the control channel and of the underlying flow channel to be driven together.

2. The valve of claim 1 further comprising a reflective micromirror surface positioned over the ceiling of the flow channel, wherein a physical orientation of the reflective micromirror surface altered when the deflectable ceiling of the flow channel is driven into the flow channel.

* * * * *